Nov. 15, 1960 H. S. EVERHART 2,960,209
BUCKET ELEVATOR
Filed Oct. 23, 1958 2 Sheets-Sheet 1

INVENTOR:
HAROLD S. EVERHART,
BY David Young
ATT'Y.

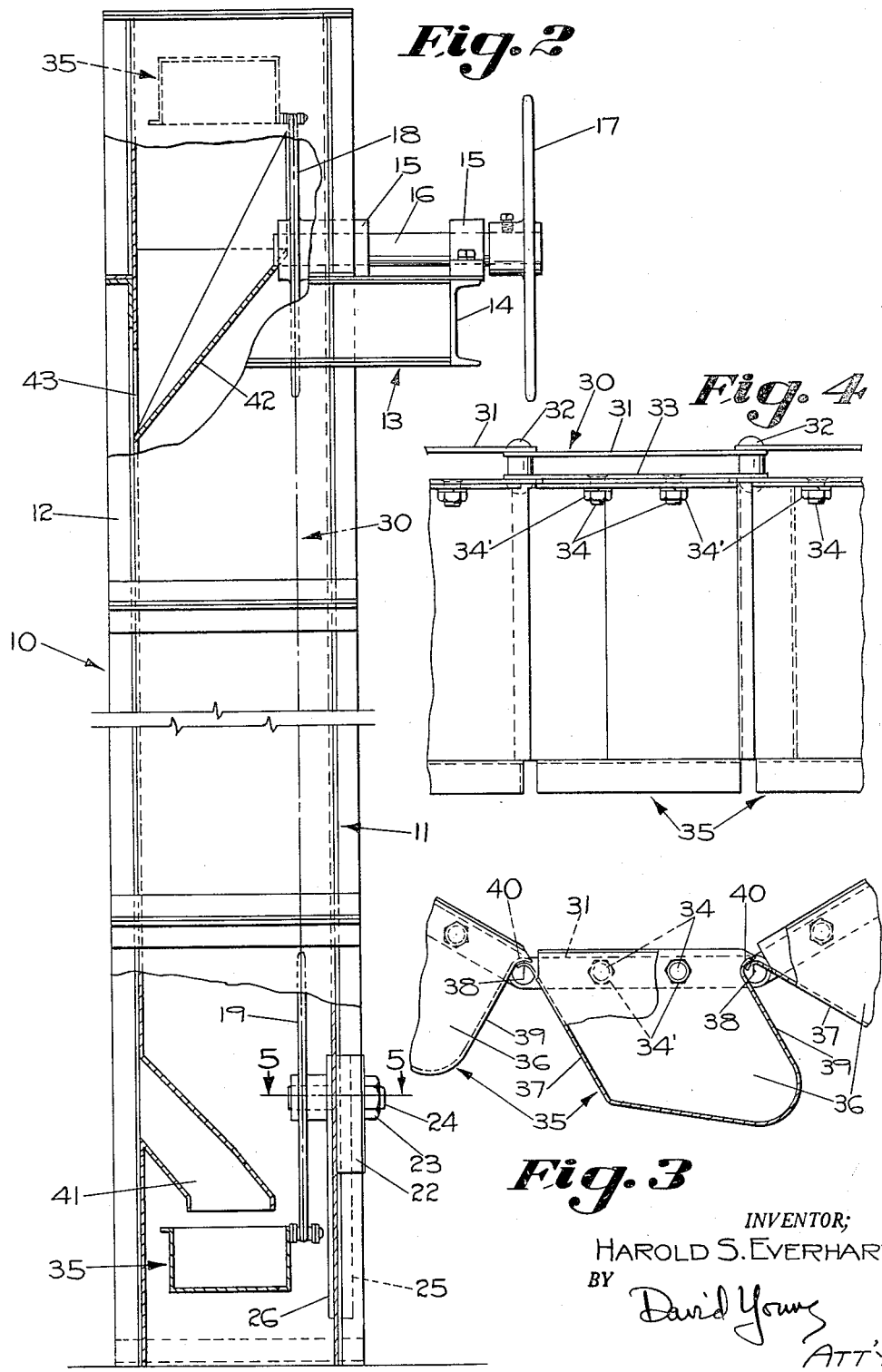

United States Patent Office
2,960,209
Patented Nov. 15, 1960

2,960,209
BUCKET ELEVATOR

Harold S. Everhart, Columbus, Ohio, assignor to The Jeffrey Manufacturing Company, a corporation of Ohio Filed Oct. 23, 1958, Ser. No. 769,109
1 Claim. (Cl. 198—140)

The instant invention relates to an elevator comprising an endless flexible carrier element which is adapted to be driven in an orbital path and having attached thereto a plurality of buckets successively disposed on the endless carrier element, with the buckets opening inwardly of the orbital path, the material to be conveyed being delivered to the buckets at a point within the orbital path and being discharged by the buckets at another point within the orbital path.

It is the prime object of this invention to provide a bucket elevator adapted to operate in an orbital path in which the buckets open inwardly of the path, and comprising means disposed within the orbital path for delivering material to the buckets and for discharging material from the buckets.

It is a further object of the instant invention to provide a bucket elevator comprising a single endless carrier element adapted to be driven in an orbital path, in which there is provided a plurality of buckets successively attached to the endless carrier element in cantilever manner.

It is another object of the instant invention to provide a bucket elevator comprising a plurality of successive buckets for the reception of material, in which adjacent portions of adjacent buckets overlap each other to close the area between said adjacent buckets to prevent the spillage of material delivered to the buckets.

It is also an object of this invention to provide a bucket elevator comprising an endless chain formed of a plurality of successive links joined by articulating means, and a bucket secured to each link independently of the articulating means, with the successive buckets being adapted to pivot relatively to each other about the axis of the articulating means, and adjacent portions of adjacent buckets comprising overlapping portions formed with arcuate sections permitting the buckets to pivot relatively to each other.

It is still another object of the instant invention to provide a bucket elevator comprising a single endless flexible carrier element adapted to be driven in an orbital path, and a sprocket wheel disposed at opposite ends of the orbital path for supporting and driving the carrier element, with a plurality of buckets successively secured to the endless carrier element and opening inwardly of the orbital path, and means for delivering material to the buckets disposed within the orbital path opposite one of the sprocket wheels and means for discharging material from the buckets also disposed within the orbital path located opposite the other of the sprocket wheels.

Other objects of the invention will appear hereinafter, the novel features and combinations being set forth in the appended claim.

In the accompanying drawings:

Fig. 2 is a side elevational view, partially in section, of the bucket elevator illustrated in Fig. 1;

Fig. 3 is an elevational view, partially in section, of several buckets in the bucket elevator of Fig. 1;

Fig. 4 is a plan view of the buckets illustrated in Fig. 3; and

Figure 1:
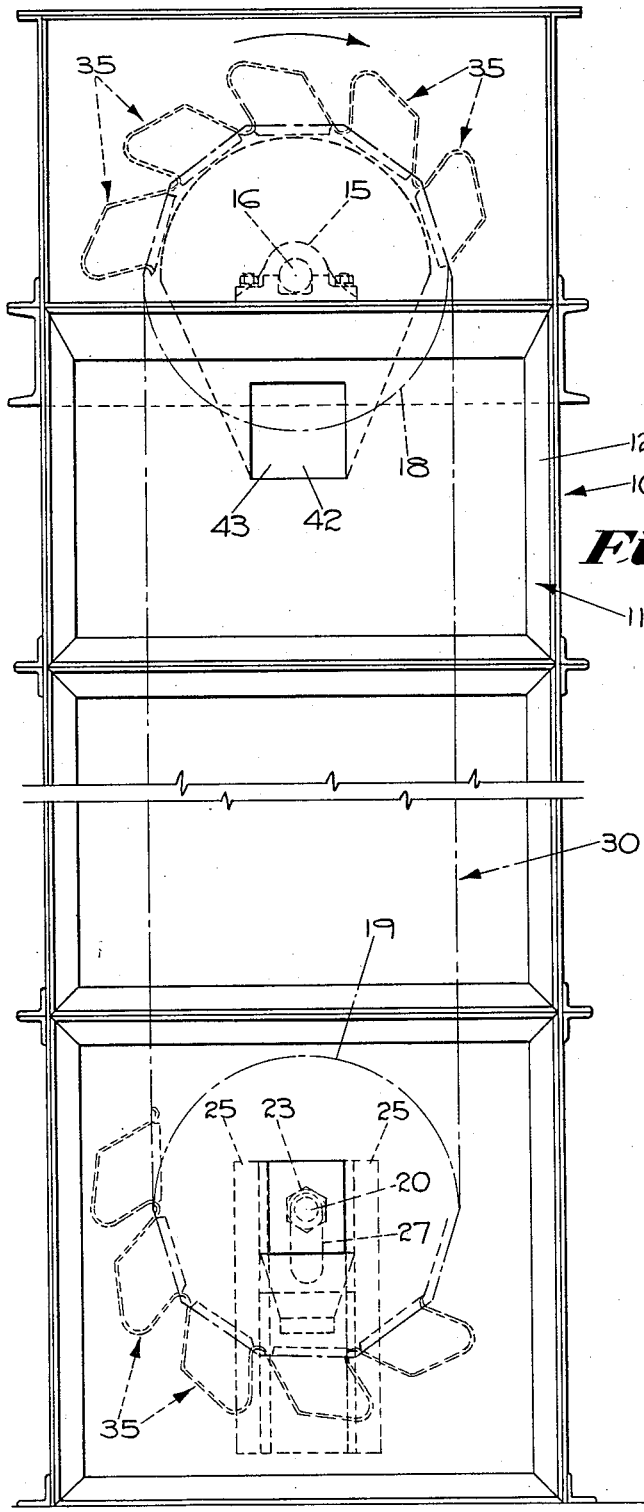
Fig. 1 is a front elevational view of a bucket elevator constructed in accordance with the instant invention.
Figure 5:
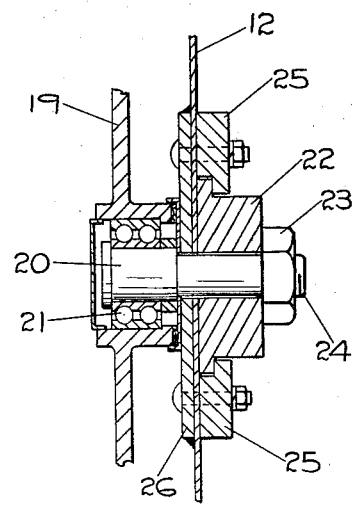
Fig. 5 is a sectional view taken on the line 5—5 in Fig. 2, and showing the structure for mounting one of the sprocket wheels.

Referring to the drawings, and particularly to Figs. 1 and 2, there is illustrated therein a bucket elevator 10 comprising an upright elevator casing 11 fabricated from a plurality of sheet metal panels 12, and providing an enclosure for the operating means of the bucket elevator 10. Near the top of the elevator casing 11 there is provided a laterally extending platform 13 formed from a plurality of channels 14 which are welded to each other and to the elevator casing 11. Secured to the platform 13 are a pair of bearing blocks 15, one of which is disposed immediately adjacent the side of the elevator casing 11, and the other being disposed at the end of the platform 13, as best seen in Fig. 2. The bearing blocks 15 rotatably support a drive shaft 16 which extends through the wall of the elevator casing 11 to the inside thereof. The outer end of the shaft 16 has a sprocket 17 fixedly secured thereto, and any suitable power drive means may be connected to the sprocket 17 for the purpose of driving the sprocket 17 and the shaft 16. The inner end of the shaft 16 disposed within the elevator casing 11 has fixedly secured thereto a drive sprocket 18 which is driven by the shaft 16.

At the bottom of the elevator casing 11 there is provided an idler sprocket 19 which is rotatably mounted upon a short shaft 20 by means of suitable anti-friction bearing means 21. The shaft 20 is supported by a slide 22, which fits between guide rails 25 disposed one at either side of the slide 22. The panel 12 of the casing 11 behind the guide rails 25 is reinforced by a plate 26 welded thereto. The plate 26 and the panel 12 are formed with an elongated opening 27, as seen in Fig. 1, through which the shaft 20 passes. The slide 22 may be moved up and down along the guide rails 25 for adjustment of the position of the idler sprocket 19. The slide 22 is secured in adjusted position by the nut 23 threaded on the end 24 of the shaft 20, by means of which the shaft 20 is brought to bear against the reinforcing plate 26.

An endless chain carrier element 30 is trained about the sprockets 18, 19 and is disposed in an orbital path with the sprockets 18, 19 defining the opposite ends of the orbital path. The drive sprocket 18 drives the endless chain carrier element 30 in the orbital path. The endless chain carrier element 30 comprises a plurality of chain links 31, as seen in Figs. 3 and 4, which are connected to form the endless chain carrier element 30. The adjacent ends of successive chain links 31 are joined by articulating means comprising pins 32, which permit the adjacent chain links 31 to pivot relatively to each other. The side bar 33 of each chain link 31 has secured thereto, as by welding, a pair of threaded studs 34 for the purpose of supporting on the chain link 31 a bucket 35, the latter being formed with a pair of holes in a side wall 36 thereof which register with the studs 34. Nuts 34' are threaded on the studs 34 to secure the bucket 35 to the chain link 31, whereby the buckets 35 are each secured to a chain link 31 independently of the articulating pins 32, which connect successive chain links 31.

In the bucket elevator 10 of the instant invention there is provided only a single endless chain carrier element 30, as seen in Fig. 2, for moving the buckets 35 in the orbital path in which the carrier element 30 is disposed. Each bucket 35 extends laterally from the carrier element 30 and is attached thereto in a cantilever manner. Successive buckets 35, being each secured to a single chain link 31, are adapted to pivot relatively to each other about the axis of the pin 32 which pivotally joins adjacent chain links 31. The leading wall 37 of the bucket 35 has its leading edge 38 formed with an arcuate section having the axis of the pin 32 as its center. The trailing wall 39 of the bucket 35 has its trailing edge 40 also formed with an arcuate section having the axis of the pin 32 as its center. As seen in Fig. 3, the trailing edge 40 of one bucket 35 overlaps the leading edge 38 of the next successive bucket 35 in the train of buckets 35. Thus, the edges 38 and 40 close the area between adjacent buckets 35 and prevent the spillage of material in this area. Since the edges 38, 40 are each formed with an arcuate section having the axis of the pin 32 as a common center, it is possible for the adjacent buckets 35 to freely pivot relatively to each other.

The bottom of the elevator casing 11 comprises a feed chute 41 which is disposed directly opposite the idler sprocket 19, extending inwardly from the side of the elevator casing 11, and overlies the path of the buckets 35. The feed chute 41 is disposed within the orbital path of the buckets 35, and since the buckets 35 open inwardly of the orbital path the material discharged through the chute 41 will be received in the buckets 35 and carried thereby to the top of the orbital path at which point the buckets 35 assume an inverted position to discharge the material therefrom. At the top of the elevator casing 11 directly opposite the drive sprocket 18 there is provided a discharge chute 42 onto which the material spills from the buckets 35 at the top of the orbital path thereof. The material is discharged from the chute 42 through an opening 43 in the side of the elevator casing 11.

In the bucket elevator of this invention there is provided a single endless chain carrier element to which the material carrying buckets are secured. The buckets open inwardly of the orbital path through which they are carried by the endless chain carrier element. Thus the means for delivering the material to the buckets may be disposed within the orbital path closely adjacent to the buckets, and similarly the discharge means which receives the material discharged by the buckets is also disposed within the orbital path relatively close to the buckets. The adjacent portions of adjacent buckets in the novel elevator include overlapping portions which prevent spillage of material in the area between said adjacent buckets, whereby there is virtually no loss of material in the novel bucket elevator.

Obviously those skilled in the art may make various changes in the details and arrangement of parts without departing from the spirit and scope of the invention as defined by the claims hereto appended, and applicant therefore wishes not to be restricted to the precise construction herein disclosed.

Having thus described and shown an embodiment of the invention, what it is desired to secure by Letters Patent of the United States is:

In an elevator adapted to operate in an orbital path and to convey material from one point to another point in that path, a single endless flexible carrier chain disposed in said orbital path and comprising a plurality of successively disposed links and articulating means connecting said links one to another for movement of the links relatively to each other, sprocket wheels engaged with the links of the carrier chain for supporting and driving the carrier chain in said orbital path, a plurality of buckets secured in succession to the carrier chain to be carried around the orbital path by the carrier chain, each bucket comprising a leading wall, a trailing wall spaced from the leading wall and a side wall extending between the leading wall and the trailing wall, each bucket being secured to one link of the carrier chain, securing means extending through said side wall of a bucket for securing the bucket to a link in fixed position relatively to the link, the upper edge of the leading wall of each bucket being curved with a transverse arcuate section having its axis coincident with the axis of said articulating means, the upper edge of the trailing wall of each bucket being curved with a transverse arcuate section having its axis coincident with the axis of said articulating means, the curved upper edge of the leading wall and the curved upper edge of the trailing wall of successive buckets being complementally formed and disposed in overlapping interfitting relation to form a closed joint between successive buckets and permitting relative movement of the buckets as they are carried around in the orbital path by the endless carrier chain.

References Cited in the file of this patent

UNITED STATES PATENTS

| | | |
|---|---|---|
| 269,295 | Kirby | Dec. 19, 1882 |
| 1,426,179 | Glass | Aug. 15, 1922 |
| 2,318,658 | Alvey | May 11, 1942 |
| 2,753,979 | Blackman et al. | July 10, 1956 |